Patented May 11, 1954

2,678,303

UNITED STATES PATENT OFFICE 2,678,303

WATER TREATING AND CLEANING COMPOSITION

Paul W. Bonewitz and Elmer H. Fults, Burlington, and Sebern W. Hockett, Mount Pleasant, Iowa No Drawing. Application September 7, 1950, Serial No. 183,658

11 Claims. (Cl. 252—156)

This invention relates to a water treatment useful in connection with both soft and hard waters employed for industrial and domestic purposes and is effective upon cold water, water at ordinary temperatures (70° F.), as well as water having an elevated temperature, e. g., particularly water having a temperature of about 140° to 170° F. used in bottle washing, as well as boiling water.

We have discovered that a mixture of alkali metal caustic and dextrin will sequester, i. e., solubilize the water salts as well as remove scale and soil, such as grease, calcium caseinates and sulfates, etc., in a highly effective manner. The advantages of the mixture are due to the chelating effect of the dextrin in the presence of caustic as demonstrated by actual field use and by laboratory testing of the invention. That is, the metal ions of the water salts as well as of the scales and soils are chelated to the dextrin (as water soluble chelation products) in the presence of the caustic whereby the metal salts become solubilized and the caustic is free to exert an optimum cleaning effect without interference from the metallic water salts. Also, it is observed that the dextrin itself in the presence of the caustic exerts a cleaning effect by reason of its chelating action upon the soils. In other words, the calcium, magnesium, iron, nickel, copper, aluminum, etc., are chelated into stable soluble ring structures by the dextrin in the presence of the caustic and the caustic is thus enabled to operate more effectively as a cleaning agent and is assisted in this respect by the presence of the dextrin.

EXPLANATORY NOTE TO CHELATION

The problem of rendering soluble and keeping sequestered the hardness salts of waters where alkaline conditions must be maintained has heretofore proved an expensive process particularly where the water must be used in relatively large volumes. The hydroxides of some of the common metals such as calcium and magnesium are particularly difficult to solubilize in alkaline solutions and they form objectionable residues, precipitates, scums, scale, or suspensions. This invention provides an economical means of locking these interfering elements into stable, water soluble ring structures which we identify as chelate ring compounds. This is done without the employment of any amino or other relatively costly nitrogenous compounds or complex phosphates. As an example, soluble chelate compounds are formed by this invention by two types of linkage, namely, (1) electrovalent and (2) coordinant covalence as shown in the structures of calcium dextrino-chelate, illustrated below where each unit of the "n" units of the dextrin molecule $(C_6H_{10}O_5)_n$ is utilized to hold one atom of the bivalent metal.

*Ilustration 1.*—*Double covalent chelation*

Dextrin unit $(C_6H_{10}O_5)_1$ before chelation:

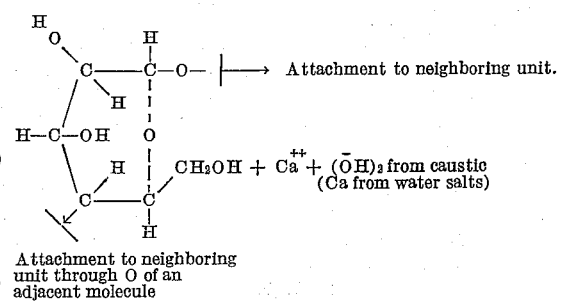

yields a water soluble chelated metallic dextrino unit $Ca.C_6H_{10}O_5$:

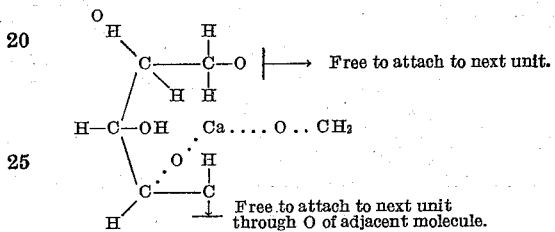

The electronic equation of the chemical reaction as just shown above is as follows:

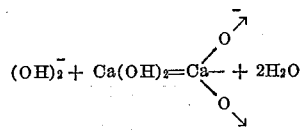

In the above structure of the chelated dextrin unit (one of several variable types in equilibrium) both of the valence bonds of the atom calcium are definitely co-valent linkages, but other ring closures are present in equilibrium with this type wherein one of the bonds is semi-ionic or may even be enolic or acidic and hence electrovalent in character just as in the case where the oxygen linkage to an adjacent unit lets go to form a lactonic or acetic COO linkage as now illustrated below:

*Illustration 2.*—*Electrovalent and coordinate covalent*

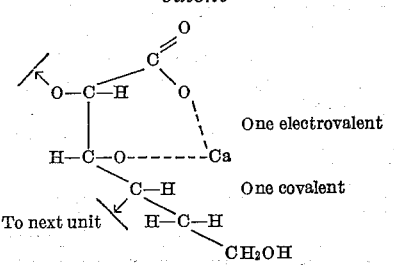

In this closure, the reaction is

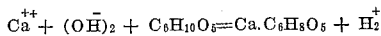

(a calcium-dextrino chelate).

The high stability and great solubility of these chelated metallic dextrino rings and their lack of ionic character or polarity towards substances outside the molecule explain why the hardness-producing metallic elements are retained so tenaciously in clear, sparkling solution when in the presence of excesses of hydroxyl ions, or boiling in caustic mixtures.

The improved product can be prepared as a dry mixture of dextrin and caustic or as an aqueous solution of the two. Proportions are not of a critical nature as the ratio of dextrin to caustic employed in the water treatment will depend upon the nature of the water, type of soil and other conditions of use.

The results obtained by the use of the mixture were surprising in view of the well-known precipitating action of caustic and the coagulating effect of dextrin where either of these substances has been used without the other in water treatment and more particularly at high temperatures. In practical operation, only a relatively small amount of dextrin need be employed with the caustic to accomplish the unusual results described above.

EXAMPLE 1

Dry caustic soda and dry dextrin obtained from potatoes ("potato flaxen dextrin") are mixed as powder or granules using about 3 parts by weight of the dextrin to 97 parts by weight of the caustic.

This mixture will be introduced to the water in an amount dependent upon the causticity requirements for the particular use; for instance, in bottle washing about 3 pounds of the mixture for each 10 gallons of water will take care of an extreme condition of 30 grain water or higher.

EXAMPLE 2

For the purpose of preparing an aqueous solution, 98½ pounds of 50% aqueous caustic solution at room temperature is added with agitation to 1½ pounds of dry powdered dextrin. The dextrin goes into solution in the water of the aqueous caustic solution.

EXAMPLE 3

Another aqueous solution is prepared by adding 95 pounds of 50% aqueous caustic solution to 5 pounds of a 30% aqueous solution of dextrin (e. g., "torrefied starch" such as "Canary Yellow"), at room temperature and agitated until a homogeneous mixture is obtained.

EXAMPLE 4

The 30% dextrin solution of Example 3 is diluted with water and dry caustic in the form of powder is added to produce a homogeneous mixture of the same consistency and concentration as Example 3.

EXAMPLE 5

An aqueous or dry product is prepared according to the foregoing examples containing 80% caustic and 20% dextrin on a dry basis.

Where 75% caustic solution is used, the mixing should take place at a temperature at least above 144° F. and about 2½ pounds of dry dextrin are added to 97½ pounds of the 75% caustic solution or to 7½ pounds of the 30% aqueous dextrin solution there is added 92½ pounds of the caustic.

Where 25% aqueous caustic solution is used, 1 pound of dry dextrin will be added to 99 pounds of the caustic solution and where 30% aqueous dextrin solution is employed, to 3⅔ pounds thereof, will be added 96⅓ pounds of the aqueous 25% caustic solution.

A lower concentration of dextrin may be employed in aqueous solution, e. g., less than a 30%, but this latter is preferred since it represents about the maximum which can be produced without jelling.

The proportions indicated by the products in the foregoing examples, are, as previously stated, not critical but have been found preferable for general uses, notably, in bottle washing and vacuum-pan cleaning, and it will be noted that relatively small amounts of dextrin are employed with large amounts of caustic soda. When these products are added to water to be treated and used, they readily dissolve and in the dilute solution, the dextrin is present in amount of about .0015% to 3% which, in the presence of the caustic, has been found highly effective for most conditions.

We have prepared and used mixtures of dextrin and caustic soda both as the dry product of Example 1 or as the aqueous or dry products of the other examples in the ratio of between about .5 and 50 parts dextrin to between about 99.5 and 50 parts caustic on a dry basis. Greater quantities of dextrin may be included in the products if desired, i. e., more than 50 parts dextrin may be utilized on a dry basis in some cases depending on conditions.

It may be useful in some cases to employ wetting agents preferably anionic (although non-ionic may be used) in order to reduce the surface tension of the aqueous solution to thereby assure faster penetration of the soil and quicker drainage from the surface being treated. The wetting agents are the usual commercial anionic and non-ionic agents of which there are many available and are preferably used in amount of .5 to 5 parts by weight. For some purposes larger quantities may be used. Typical wetting agents are:

*Anionic wetting agents*

1. Tergitol 08.—Sodium sulfate derivative of 2-ethyl hexanol-1.
2. Tergitol 4.—Sodium sulfate derivative of 7-ethyl-2 methyl undecanol-4.
3. Nytron.—Complex mixture of sulfonated ketones, amines, alkyl sulfamates.
4. Nacconol NRSF.—Alkyl aryl sulfonate.
5. Neomerpin.—Derivative of alkyl naphthalene sulfonate.

*Non-ionic wetting agents*

1. Igepal CA Extra.—Alkyl aryl polyethylene glycol ether.
2. Sterox CD.—Polyoxyethylene ether.
3. Triton X100.—Alkylated aryl polyether alcohol.
4. Nonic 218.—Polyethylene glycol tertdodecyl thioether.
5. Cerfax 1301.—Alkyl polyoxyethylene alcohol, modified.

It has been found that the introduction of the dextrin solution into the caustic solution produces highly objectionable gumminess and coagulation notwithstanding that elevated temperatures as well as room temperatures were tried and with agitation. We have discovered that this can be overcome if the caustic solution is poured into the dextrin solution at room temperature or elevated temperatures with agitation, i. e., the gumminess or coagulation is avoided and complete dispersing and mixing of the two solutions as a mixture is obtained. In a preferred method, the caustic solution at a temperature of about 160° F. is poured into the dextrin solution having room temperature and the mixture agitated. The caustic soda solution is also added to the dextrin solution with the caustic soda solution having a temperature of from 50° F. to 300° F. with agitation and with the dextrin solution having a temperature of about room temperature. Where the caustic solution has a high temperature, e. g., in excess of about 200° F., it is desirable to add the same rapidly to the dextrin solution and cool rapidly, for instance to below 170° F. if the mixture is to be held for any considerable period of time.

The dextrins employed in this invention are the usual commercial products and obtainable from many sources and in various grades of purity, for instance, dextrins from cassava, potatoes, corn, sago, rice, wheat, etc. In other words, the dextrins are obtained from all types of starch plants, grain, vegetable and fruit sources by any of the conventional processes such as by fermentation, torrefaction and acid degradation.

We have found that the lower the value of "$n$" in the dextrin molecule $(C_6H_{10}O_5)_n$ the more effective is the dextrin as a chelating agent in the presence of the caustic. In this connection, while we have referred herein to dextrins, we, of course, include compounds which, in the presence of water and caustic, are either hydrolyzed to dextrin such as the dextrinates, notably, sodium or potassium dextrinates, or react to form dextrin.

While we have referred to the use of caustic soda, other alkali metal caustic may be used, particularly potassium.

The products of this invention in aqueous solution all have a pH on the alkaline side, i. e., above about pH7.

As indicated above, the products are made available for introduction to the water to be treated either in a dry or solution state. Also, the solutions as prepared by the herein examples, can be formed as particles, e. g., be granulated by means of a Dopp Kettle or other granulating means. Moreover, in some cases the dextrin solution is sprayed upon granular caustic in a suitable agitator whereby to coat and impregnate the granules or particles of caustic with the dextrin and thus provide a granular product. Also, the mixture can be solidified in the form of blocks or cylinders of any size desired, by reducing the temperature of the mixture to a point at which solidification takes place. Such blocks or any of the solidified products can be ground and granulated.

As explained, the compositions of this invention are added to water to solubilize the metal salts thereof and render the water useful for cleaning purposes, e. g., on metal and glass surfaces, food processing equipment, in the textile industry and commercial laundry work. Particularly this invention is useful where reliance is had upon caustic for processing or cleaning and the chelating action is not only effective on the objectionable water salts but chelation attacks the scale and soil to loosen, remove and solubilize the same from surfaces being cleaned. For practical purposes and as indicated by the herein examples, a preferred range of a mixture of dextrin and caustic for treating water and for cleaning purposes is between about 2 and 25 parts dextrin to between about 98 and 75 parts caustic soda on a dry basis.

EXAMPLE 6

This example is like Example 5 above except that about 80 parts of caustic, 18 parts dextrin and 2 parts of one of the wetting agents abovementioned is used on a dry basis. This product is particularly valuable for cleaning of belly boxes in packing plants and for cleaning ammonia condensers.

EXAMPLE 7

In this example, dry caustic granules about 95 parts in an agitator or mixer are sprayed with about 5 parts of a 30% dextrin solution of 69% water and 1% mineral acid, e. g., HCl, $HNO_3$, etc., or organic acids, e. g., acetic, tartaric, citric, etc. The addition of a small amount of acid such as not more than about 5%, improves the absorption of the dextrin by the caustic and coverage of the caustic by the dextrin as well as enhances the adherence of the caustic granules and dextrin, and also thins the solution to facilitate for spraying.

While we have referred to aqueous solutions of caustic soda in concentrations of about 25% to 75%, it is to be understood that higher and lower concentrations may be employed, and those given are the generally available commercial concentrations.

The dextrin-caustic solution, as mentioned above, can be used to form flaked particles by employing a suitable flaker. The aqueous solution of the dextrin-caustic composition is maintained above the congealing point of the caustic, e. g., about 140° to 320° F., preferably, in the neighborhood of 140° F. The flaker drum, which is cooled, is revolved in the heated solution at a speed slow enough for the solid material to congeal and settle out or deposit thereon as a layer or film from which it is broken up and removed by the usual knife blade.

EXAMPLE 8

This example illustrates the production of a flaked dextrin-caustic composition ready for use.

About 3½ pounds of dry powdered potato flaxen dextrin was added to approximately 100 pounds of 73% aqueous caustic solution to give about a 3% dextrin content in the composition. This addition was accomplished in a jacketed steam kettle having an agitator for thorough mixing and dissolving of the dextrin in the caustic. The mixing was carried out for fifteen minutes. The temperature in the jacketed kettle was held at about 180° to 200° F.

The solution was drawn off and fed to a conventional flaker apparatus which included a rotating water-cooled drum running in a jacketed heated pan containing the caustic-dextrin mixture. The cooling water used in the drum came into the roller at 84° F. and left at 86° F. The temperature of the solution in the pan varied from about 140° to 160° F., with the preferred temperature between about 140° and 150° F. The roll speed varied from 1 to 1⅝ R. P. M., the latter value giving the better results. Greater speeds may be employed and, in fact, it was noted that the film was breaking away ahead of the knife blade making it possible to secure quite large flakes so that by speeding up the drum or controlling its speed, flakes of any desirable size were obtainable. The film was readily deposited on the drum and was removed therefrom by the usual knife. The product was checked for chelation effect in Mount Pleasant, Iowa and Barberton, Ohio, tap water, and the results were satisfactory.

The process was continued for fifty minutes producing 52 pounds of light yellow flakes of the 73% caustic and 3% dextrin. The product was also checked against synthetic hard water containing 24 grain magnesium hardness and 24 grain calcium hardness, and by the dilution method it was determined that this flaked product would chelate from 15 to 18 grain of this calcium-magnesium composition.

In the past, attempts to flake 73% caustic solution alone have not been successful due to a variety of reasons, especially because of its ability to pick up moisture which is a distinct disadvantage. The dextrin-caustic flake products produced in this example constitute a marked improvement in this respect.

The temperature of the flaking drum is always maintained below 140° F. and preferably is cooled to substantially below this temperature, as indicated above, in order to assure the continuous formation of a film of the mixture thereon.

The concentrations used in the above example are not in any sense limiting as any concentration of aqueous liquid caustic, notably 25 to 80% is useful with the incorporation of the dextrin and flaking in the manner described. Likewise, the 3% dextrin used in the above example is not a limiting concentration. A useful concentration range for the dextrin is from about one-half percent up to 20% to 30% on a dry basis. The amount of dextrin is, of course, determined by the use to which the product is to be applied. For ordinary bottle washing, vacuum pan cleaning and the like, 3% dextrin is the most economical and practical. While we have mentioned the use of dry dextrin in this example, it is to be understood that an aqueous dextrin solution may be employed with equally satisfactory results using concentrations of the dextrin to give amounts just recited on a dry basis. Flakes as well as other products of this invention may have a composition of about one-half to 30 parts dextrin and 70 to 99½ parts caustic on a dry basis.

While we have referred to a flaker apparatus including a water-cooled rotating drum, this may be cooled in any other suitable way as by air. The important thing is to have the surface of the flaker apparatus on which the film congeals and deposits cooled to a temperature which will cause the film to rapidly form from the aqueous caustic-dextrin mixture. Thus, other forms of flaker apparatus which do not use a rotary drum may be employed; and we are not limited to the particular form of the flaking apparatus employed.

Products prepared in accordance with this invention, and notably the flake products, will chelate hard water salts into solution in varying caustic concentrations, i. e., in water having a causticity of from about .25% Na₂O upward to very high concentrations, e. g., 40 to 50% Na₂O, and this result is obtained at all temperatures including cases where the water was boiling. It is noted that the invention aids in the reduction of scale and removal of scales such as calcium carbonate, sulfates and mixtures of the same; moreover, the products of this invention substantially reduce corrosion on zinc or tin and have good derusting properties and de-greasing characteristics. For instance, the invention is useful in cleaning trucks and trolleys in meat-packing plants by a single operation, where formerly both acid and alkali cleaning was necessary; and, in fact, the products of the invention are ideal for use in food plants generally.

After the formation of the product on the drum or roll and the breaking of the film by the knife blade to form the flakes, the flakes are carried on a conveyor to a sifting or shaking screen and from there into a hopper and directly into the shipping drum whereby exposure to the atmosphere is reduced as far as possible.

While we have referred herein to aqueous solutions of caustic soda in concentrations of about 25% to 75% as being useful in this invention, it is to be understood that higher and lower concentrations of alkali metal caustic may be employed in the various examples and the concentrations given herein are the generally available commercial concentrations.

This application is a continuation-in-part of our copending application, Serial No. 175,654, filed July 24, 1950, and includes all of the disclosure and claims thereof.

We claim:

1. A water soluble, water treating and cleaning composition consisting essentially of caustic alkali selected from the group consisting of sodium, hydroxide and potassium hydroxide and dextrin in amounts to sequester hard water salts and prevent precipitation thereof whereby the cleaning action of the caustic is not interfered with, the ratio of the caustic to the dextrin being between about 50 to 99.5 parts caustic to between about 0.5 to 50 parts dextrin, by weight on a dry basis.

2. The composition of claim 1 in aqueous solution.

3. The composition of claim 1 in which there is present a compatible wetting agent.

4. The method of treating water containing hard water salts to produce a washing solution which comprises adding to the water caustic alkali selected from the group consisting of sodium hydroxide and potassium hydroxide, and dextrin, the ratio of the caustic to the dextrin being between about 50 to 99.5 parts caustic to between 0.5 to 50 parts dextrin by weight on a dry basis, the amounts of dextrin and caustic in said ratio being sufficient to sequester hard water salts whereby the cleaning action of the caustic is unhindered.

5. The method of washing articles which comprises treating the articles with an aqueous solution of caustic alkali selected from the group consisting of sodium hydroxide and potassium hydroxide, and dextrin, the ratio of the caustic to the dextrin being between about 50 to 99.5 parts caustic to between about 0.5 to 50 parts dextrin by weight on a dry basis, the amounts of dextrin and caustic in said ratio being sufficient to sequester hard water salts whereby the cleaning action of the caustic is unhindered.

6. In the washing of glassware and metal with water containing hard water salts with caustic solutions, the method of solubilizing said salts to free the caustic for optimum cleaning effect which comprises adding to the water, caustic alkali selected from the group consisting of sodium hydroxide and potassium hydroxide, and dextrin, the ratio of the caustic to the dextrin being between about 50 to 99.5 parts caustic to between about 0.5 to 50 parts dextrin by weight on a dry basis, the amounts of dextrin and caustic within said ratio in the composition being sufficient to sequester hard water salts whereby the cleaning action of the caustic is unhindered.

7. The method of claim 4 in which a compatible wetting agent is also added to the water.

8. A water soluble, water treating and cleaning composition comprising particles of caustic alkali selected from the group consisting of sodium hydroxide and potassium hydroxide and dextrin in amounts to sequester hard water salts and prevent precipitation thereof whereby the cleaning action of the caustic is not interfered with, the ratio of the caustic to the dextrin being between about 50 to 99.5 parts caustic to between about 0.5 to 50 parts dextrin, by weight on a dry basis and the caustic particles being impregnated and coated with the dextrin.

9. The composition of claim 8 containing a compatible wetting agent.

10. The method of claim 4 wherein the dextrin is present in an amount of about 0.0015% to 3%.

11. The method of claim 4 wherein the pH is greater than 7.

References Cited in the file of this patent

UNITED STATES PATENTS

| Number | Name | Date |
|---|---|---|
| 1,322,009 | Gorius et al. | Nov. 18, 1919 |
| 1,365,760 | Yoshizawa | Jan. 18, 1921 |
| 1,572,479 | Hammond | Feb. 9, 1926 |
| 1,740,064 | Boertlein | Dec. 17, 1929 |
| 2,220,950 | Bird | Nov. 12, 1940 |
| 2,356,443 | Bissinger | Aug. 22, 1944 |
| 2,363,921 | Denman | Nov. 28, 1944 |

FOREIGN PATENTS

| Number | Country | Date |
|---|---|---|
| 11,753 | Great Britain | 1898 |
| 451,929 | Great Britain | Nov. 9, 1934 |
| 566,394 | Great Britain | Dec. 28, 1944 |
| 780,292 | France | Jan. 29, 1935 |

OTHER REFERENCES

Smith-College Chemistry, 6th. ed. (1946), page 502.

Synthetic Organic Chemicals, Carbide and Carbon Chem. Corp., N. Y., 12 ed. (1945), page 90.